UNITED STATES PATENT OFFICE.

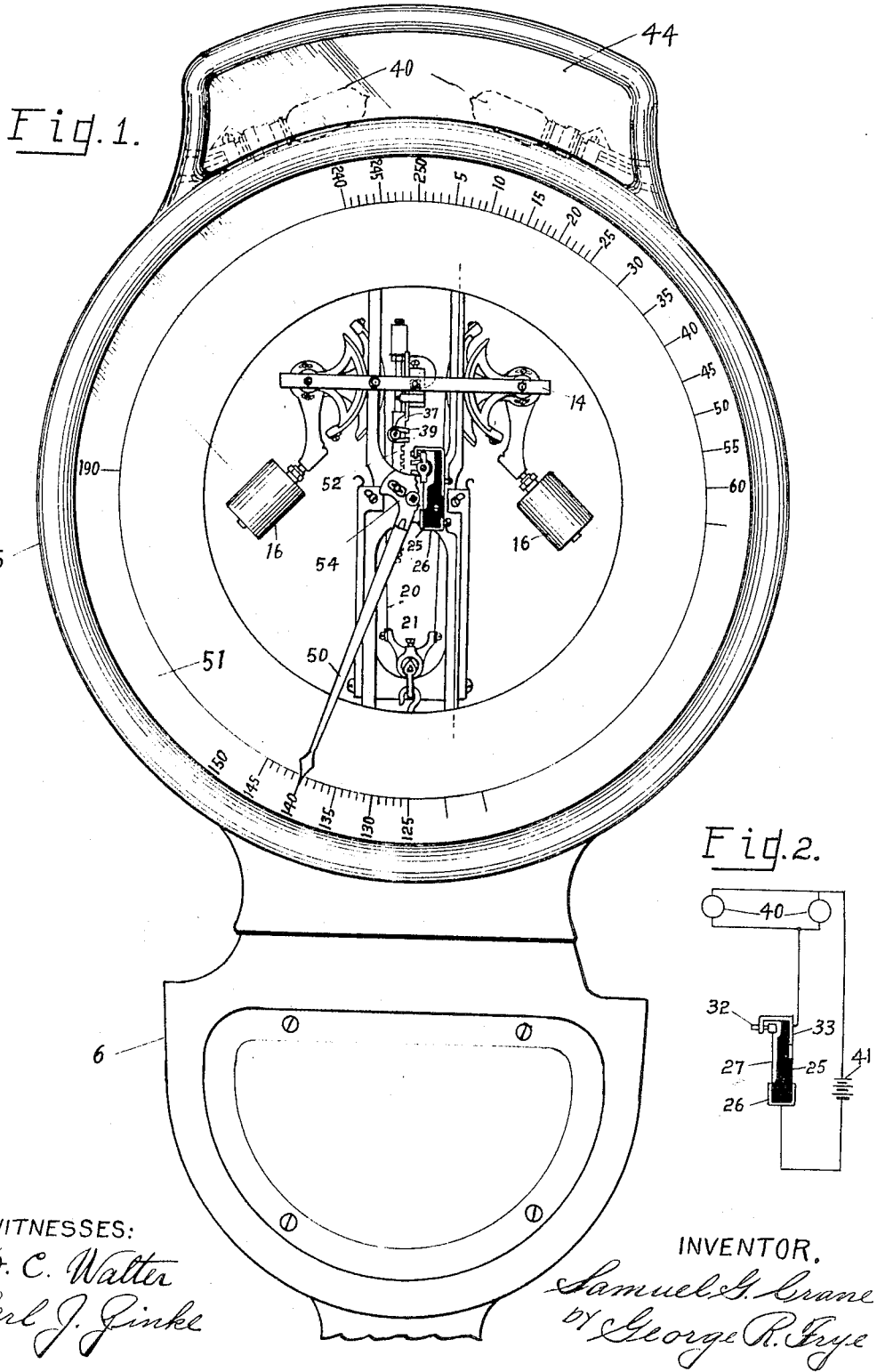

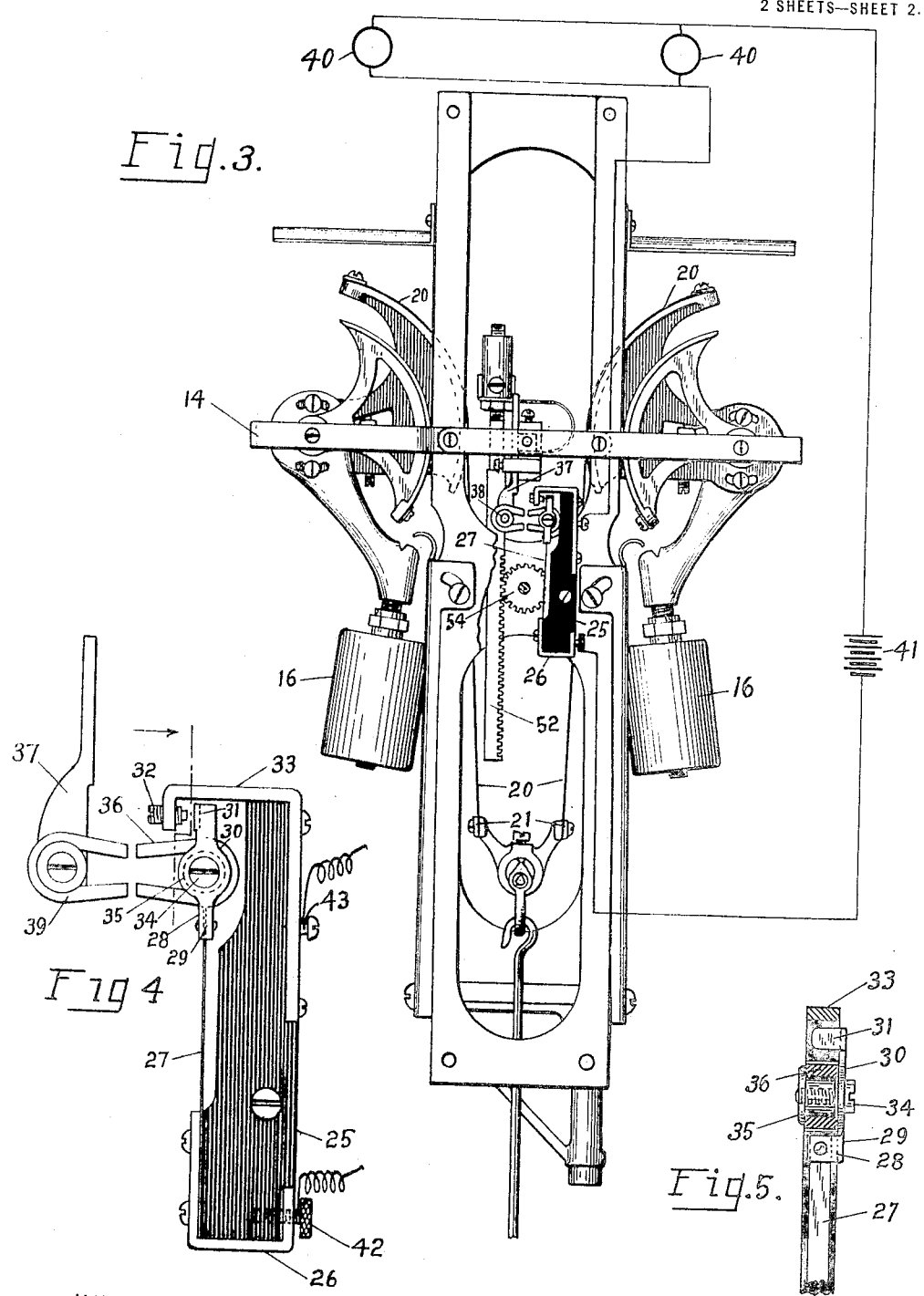

SAMUEL G. CRANE, OF TOLEDO, OHIO, ASSIGNOR TO TOLEDO SCALE COMPANY, OF TOLEDO, OHIO, A CORPORATION OF NEW JERSEY.

ILLUMINATED WEIGHING-SCALE.

1,287,896.  Specification of Letters Patent.  Patented Dec. 17, 1918.

Application filed January 27, 1915. Serial No. 4,797.

*To all whom it may concern:*

Be it known that I, SAMUEL G. CRANE, a citizen of the United States, residing at Toledo, in the county of Lucas and State of Ohio, have invented new and useful Improvements in Illuminated Weighing-Scales, of which the following is a specification.

This invention relates to improvements in illuminating devices for weighing scales and is designed primarily to provide an improved means for illuminating the scale or a translucent plate or sign carried as an adjunct thereof when the scale is employed for weighing operations.

The principal object of this invention is to provide a novel and improved form of illuminating mechanism adaptable for use with weighing scales of the double pendulum type, one example of which is shown in the illustrated embodiment of the invention forming a part of this specification.

Another object of the invention is to provide means whereby upon the weighing scale being set in operation for weighing purposes the illuminating means is simultaneously brought into operation to illuminate the scale or plates, placards, signs, etc. either carried by the scale or arranged in the vicinity thereof, and portraying directive, advertising or other interest-exciting matter.

With the above and incidental objects in view which will readily appear as the invention is better understood, my invention consists in the novel construction and arrangement of parts to be hereinafter more fully described and particularly pointed out in the appended claims.

Reference is to be had to the accompanying drawings illustrating a preferred embodiment of my invention, and wherein similar reference numerals designate similar parts throughout the several views.

In the drawings:—

Figure 1 is a front elevation of the upper portion of a weighing scale embodying my invention, and showing the scale as it would appear when weighing a load upon the scale platform.

Fig. 2 is a diagrammatic view of the wiring circuit for illuminating the electric lamps employed.

Fig. 3 is an enlarged detail view showing in front elevation the weighing mechanism of a scale equipped with my invention as it would appear when in its normal position, and Fig. 4 is an enlarged detail view showing the switch mechanism in the position shown in Fig. 3.

Fig. 5 is a detail sectional view taken substantially on the dotted line shown in Fig. 4 looking in the direction of the arrow.

In the drawings, the invention has been illustrated in connection with a conventional type of pendulum scale to portray an effective method of associating a magnetic switch with a scale mechanism of the automatic type. The construction herein shown is one of several employed in automatic scales, and comprises a pair of pendulums 16 suspended upon the framework of the scale and mounted to swing outwardly and upwardly to offset the weight of a commodity placed on the scale platform, connection being made from the pendulums to the platform through the flexible members 20 secured one to each pendulum, the equalizer bar 21 connecting the lower ends of the flexible members, and a steelyard rod connecting the equalizer bar with the lever mechanism. The indicating chart 51 is arranged in a casing 5 and is read in conjunction with an index hand 50 mounted concentrically of the chart on an indicator shaft carrying the pinion 54 with which the vertically movable rack 52 is constantly in mesh. The rack 52 is mounted centrally of a vertically movable frame including crossbars 14 carried by the pendulums whereby the frame and the rack are moved upwardly as the pendulums swing to offset the weight of a commodity being weighed, this upward movement rotating the pinion and index hand to show on the chart the weight of the commodity. The casing 5 is mounted upon a suitable column 6, the lower end of which is associated with the platform of the scale (not shown). It is to be understood that any suitable platform and platform lever mechanism may be employed in connection with the weighing mechanism of the scale.

In the embodiment herein shown the mechanism for illuminating the scale or devices associated therewith comprises a plate 25 of insulating material suitably secured to a fixed portion of the scale, as for example, the rectangular frame of the weighing mechanism and having secured at the lower end thereof a metallic plate 26 between which and the insulating plate 25 is secured the lower end of the thin flexible leaf spring 27, upon the upper end of which leaf spring is secured a switch contact member 28. The switch contact member 28 is preferably formed with bifurcated ears 29, adapted to straddle and be secured to the upper end of the leaf spring 27, and a body portion 30 arranged at right angles to the bifurcated ears 29, the upper extremity of said body portion being suitably bent, as at 31, to form a contacting surface adapted to contact with the adjustable contact screw 32 suitably secured in a metallic bracket 33 carried by the upper portion of the insulating plate 25. The body portion 30 of the switch contact member 28 is preferably provided with an opening for the reception of a screw 34 adapted to adjustably support a sleeve 35 arranged within and contacting with the inner edge of a small permanent magnet 36, which may be of the horseshoe type. The permanent magnet 36 is fixedly secured upon the switch contact member 28 so as to be laterally movable therewith upon the oscillation of the flexible leaf spring 27.

Suspended from the vertically-movable cross-bar 14 of the weighing mechanism of the scale is a bracket 37, the lower end of which carries a sleeve 38 adapted to support the permanent magnet 39 which may be of the horseshoe type.

In the normal position of the weighing mechanism of the scale the permanent magnets 36 and 39 are in the position shown in Figs. 3 and 4 of the drawings, the two magnets being positioned and arranged to bring their like poles in juxtaposition, so that the like poles of the magnets will operate to repel each other. Since the magnet 39 is fixedly secured upon the bracket 37 which is rigidly clamped to the vertically-movable cross-bar 14 this magnet 39 cannot be repelled away from its normal position. The magnet 36, however, being supported upon the flexible leaf spring 27 is free to move away from the fixed magnet 39 against the tension of the leaf spring 27 so that, when the two permanent magnets are in confronting position with their like poles adjacent, the combined repelling force of both the magnets will operate to force the movable magnet 36 and its supporting contact member 28 away from the fixed magnet 39 which will carry the switch contact member 28 away from the contact screw 32, and will open the switch.

It will be evident, therefore, that in the normal position of the weighing mechanism of the scale the switch will be open and the electrical circuit will be broken so that the lamps 40 arranged in circuit with the switch will be normally extinguished. When, however, the weighing mechanism of the scale is brought into operation, as when a load is placed on the scale platform, the cross-bar 14 will be moved vertically upward as the pendulum weights 16 are displaced to offset the load upon the platform according to the well-known operation of pendulum scales, and the upward movement of the cross-bar 14 carries the fixed magnet 39 away from its confronting position before the movable magnet 36. This upward movement of the fixed magnet destroys the magnetic fields operating to repel the movable magnet 36, and the repelling force having been removed the tension of the spring 27 serves to return the switch contact member 28 into contact with the adjusting screw 32 completing the circuit to illuminate the lamps 40.

The wiring system employed may be arranged substantially as shown in Fig. 2, the current from the battery 41 passing into the lower metallic plate 26 carrying the leaf spring 27, thence through the adjustable screw 32 and the upper metallic bracket 33 to the lamps 40, which may be suitably connected, as in series, and thence again to the batteries. Binding posts 42 and 43 connect the circuit wires to the lower metallic plate 26 and the upper metallic bracket 33 respectively.

As herein shown, the lamps 40 are placed behind a translucent glass plate 44 on which is suitably inscribed descriptive, advertising or other interest-exciting matter. It will be evident, however, that these lamps 40 might be arranged to transmit their luminous rays upon the reading portions of the scale, or might be suitably connected with the switch mechanism carried by the scale to be lighted whenever the weighing mechanism of the scale is set in operation though the lamps themselves are not carried by the scale but are suitably arranged in the vicinity thereof.

It is also to be understood that while the particular type of weighing mechanism herein shown is well adapted to illustrate the advantages of the illuminating mechanism used in connection therewith, many other forms and types of weighing mechanisms could also be employed, the invention being susceptible of many variations, modifications and changes without departing from the spirit and scope of the following claims.

Having described my invention I claim:—

1. In a scale, a circuit make and break mechanism including a fixed member carrying a bi-polar magnet, a vertically-movable member carrying a bi-polar magnet positioned and arranged to bring the poles thereof into confronting position with the like poles of the magnet carried by the fixed member in one position of its vertical movement, an an electrical circuit arranged to be opened when said magnets are in such confronting positions and closed when said magnets are in other relative positions.

2. In a scale, a circuit make and break mechanism including a fixed member, a member movable relatively thereto, a bi-polar magnet carried by each of said members, one of said magnets being positioned and arranged to repel the other of said magnets when the fixed and movable members are in their normal positions, and an electrical circuit arranged to be opened when said fixed and movable members are in their normal positions and to be closed when said members are in other positions.

3. In a scale, a circuit make and break mechanism including a fixed member, a movable member, a bi-polar magnet carried by each of said members, one of said members being flexibly supported and adapted to be moved by magnetic repulsion away from the other of said magnets when said magnets are in confronting position, and an electrical circuit arranged to be opened when said magnets are in confronting position and to be closed when said magnets are in other relative positions.

4. In a scale, a circuit make and break mechanism including a fixed member, a member movable relatively thereto, a bi-polar magnet carried by each of said members, one of said magnets being flexibly supported and adapted to be moved away from the other of said magnets when said fixed and movable members are in their normal positions, and an electrical circuit adapted to be opened when said fixed and movable members are in their normal positions and to be closed when said members are in other relative positions.

5. In a scale, a circuit make and break mechanism including a fixed member comprising a plate of insulating material, a fixed switch contact member secured thereto and a flexibly-supported movable switch contact member carried thereby, said flexibly-supported contact member carrying a magnet, a member secured upon a movable element of the scale and carrying a bi-polar magnet, the second-mentioned magnet being positioned and arranged to repel the first-mentioned magnet so as to space said movable switch contact member from the fixed contact member, and an electrical circuit arranged to be opened when said movable switch contact member is so spaced from the fixed contact member.

6. In a scale, a circuit make and break mechanism including a fixed member comprising an automatic switch having a fixed contact member, a movable contact member, and a magnet carried by said movable contact member, a vertically-movable member carrying a bi-polar magnet, the second-mentioned magnet being normally positioned to repel the first mentioned magnet so as to space said movable switch contact member from the fixed switch contact member, and an electrical circuit arranged to be opened when said switch contact members are so spaced.

7. In a scale, a circuit make and break mechanism including a fixed member comprising an automatic switch having a fixed contact member, a movable contact member and a magnet carried by said movable contact member, a bracket secured upon a movable element of the scale, a bi-polar magnet carried by said bracket, said last-mentioned magnet being normally positioned to repel the first-mentioned magnet so as to space said movable switch contact member from the fixed contact member, and an electrical circuit arranged to be opened when said switch contact members are so spaced.

SAMUEL G. CRANE.

Witnesses:
 ELIZABETH LAZARES,
 F. A. CROWLEY.